No. 753,304. PATENTED MAR. 1, 1904.
W. A. PARRY.
DISINTEGRATING MACHINE.
APPLICATION FILED APR. 24, 1903.
NO MODEL. 2 SHEETS—SHEET 1.
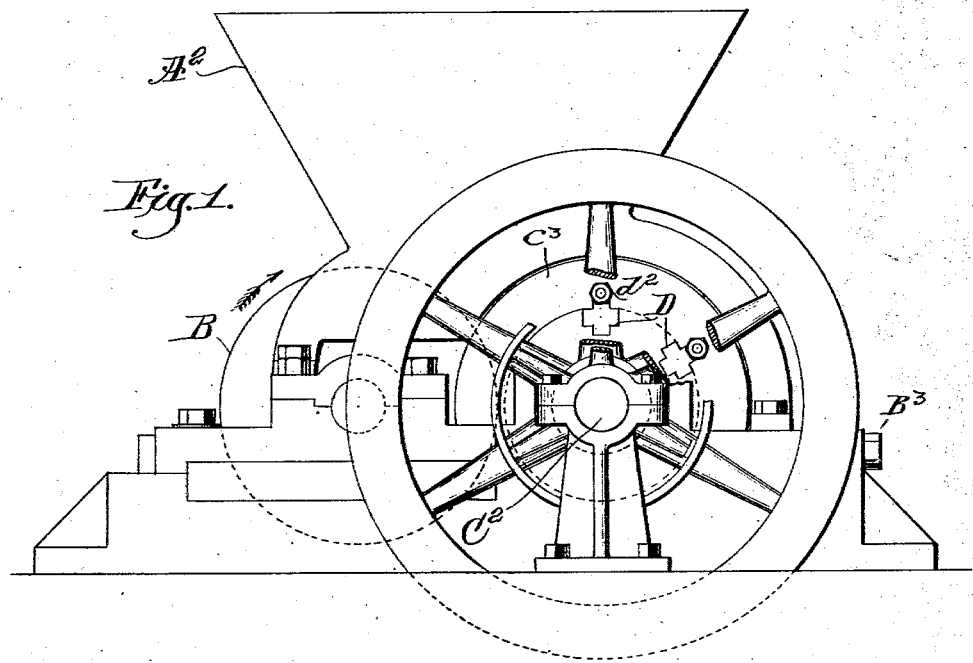
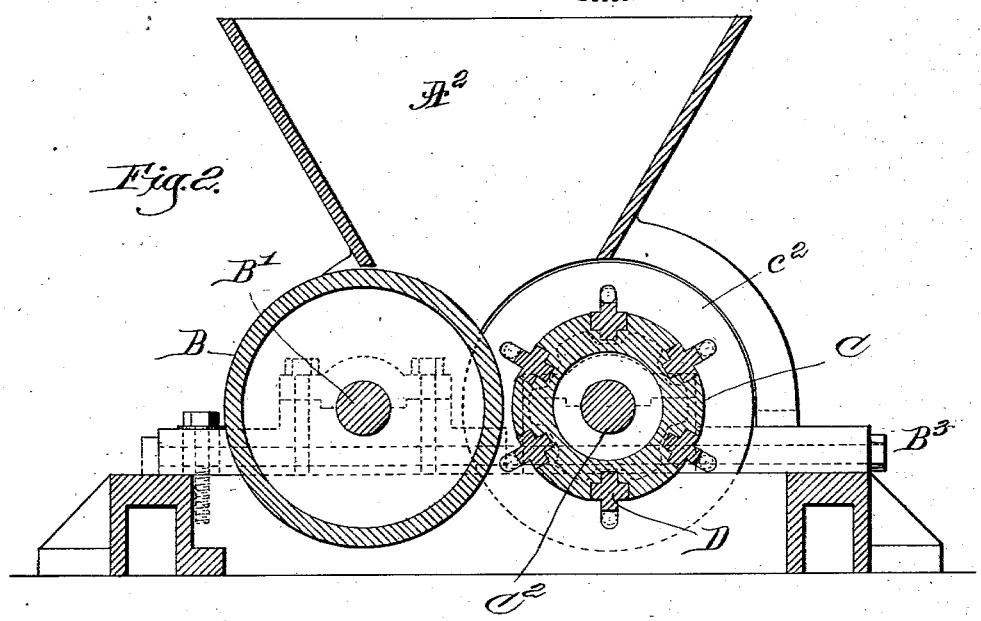

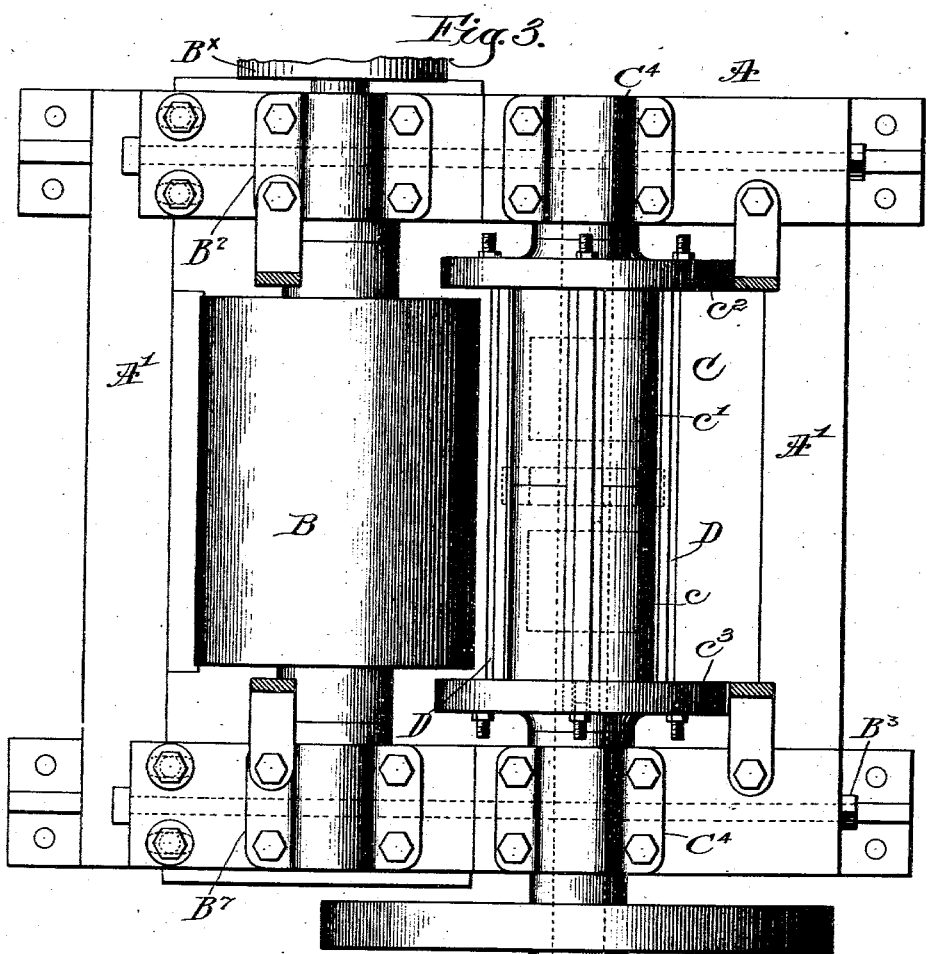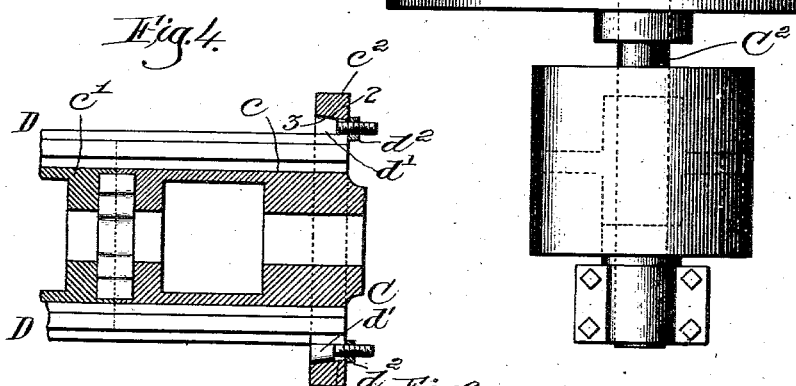

No. 753,304.

Patented March 1, 1904.

UNITED STATES PATENT OFFICE.

WILLIAM A. PARRY, OF CAMBRIDGE, MASSACHUSETTS.

DISINTEGRATING-MACHINE.

SPECIFICATION forming part of Letters Patent No. 753,304, dated March 1, 1904.

Application filed April 24, 1903. Serial No. 154,179. (No model.)

*To all whom it may concern:*

Be it known that I, WILLIAM A. PARRY, of Cambridge, county of Middlesex, State of Massachusetts, have invented an Improvement in Disintegrating-Machines, of which the following description, in connection with the accompanying drawings, is a specification, like letters on the drawings representing like parts.

This invention has for its object the improvement of disintegrating-machines for use with clay and other material that is to be broken up for the manufacture of bricks or the like.

The main features of novelty to be herein described and claimed comprise a series of novel cutters having a construction whereby they may be applied to or removed from the cutter-carrying roller. Herein the cutter is cross-shaped and has a plurality of cutting edges, shown as four, and as an edge becomes dull in use the cutter may be withdrawn endwise from its roller, be turned partially about its longitudinal axis, and be instantly reinserted in the groove from which it was withdrawn.

Ordinarily when a roller is provided with a series of cutters each having but one cutting edge whenever an edge becomes dull the machine has to be stopped and the cutter has to be removed and reground, which necessitates a considerable loss of time not only on the part of the attendants of the machine; but also the loss of use of the machine is a matter of very material moment.

Figure 1 in side elevation represents a machine with which my improvements are embodied. Fig. 2 is a cross-section of the machine shown in Fig. 1. Fig. 3 is a plan view of the machine shown in Fig. 1. Fig. 4 is a longitudinal section of a part of the cutter-carrying roller, showing the cutter in place. Fig. 5 shows detached one of the cutter-holding clamps, and Fig. 6 is an end view of one of the cutters.

The framework comprises the side frames A, cross or tie beams $A'$, a hopper $A^2$, a preferably smooth-surfaced feeding-roller B, having at one end of its shaft $B'$ a pulley or gear $B^x$, partially shown in Fig. 3 and driven by a belt or gear from any suitable counter-shaft at a much slower speed than the cutter-carrying roller to be described, are and may be all substantially as common in machines of this class and need not, therefore, be herein more fully described.

The cutter-carrying roller C is shown as comprising a shaft $C^2$, on which are keyed two hollow metallic sleeves or hubs $c$ $c'$, said hubs having, respectively, outwardly-extended flanges $c^2$ $c^3$, said flanges outside of said hubs having made through them several cutter-receiving openings $c^5$ of cross shape, said openings receiving one of the cutting edges 5 of the cross-shaped cutters D. The hubs have a series of T-shaped passages $c^4$, that receive three of the edges 5 of the cross-shaped cutter D, and these T-shaped passages are continued to and form part of the cross-shaped openings in the flanges. Each opening $c^5$ is shaped as best shown in Fig. 2, and the end of the outer branch of each opening is beveled, as at 2, (see Fig. 4,) to receive against it the beveled face 3 of the head of a clamping device $d'$, shown as threaded at one end to receive a nut $d^2$, by which to draw said device outwardly through the flange, the under side of said device acting harder and harder against the then outermost face 4 of the cutter D.

Each cutter (see Figs. 1, 2, and 6) has a plurality of cutting edges 5. The cutter shown as cross-shaped has four cutting edges, either of which may be used, and these edges may be exposed for use one after the other, as when one of the four sharpened edges becomes dull the clamping device holding it in the roller may be moved inwardly to release the cutter, and thereafter said cutter may be drawn out of the roller through one of the cross-shaped openings in the flange and be turned partially around its longitudinal axis and be reinserted in the roller with a fresh or sharp edge exposed for use.

The two parts of the roller are keyed to the shaft $C^2$, sustained in suitable bearings, as shown, and provided with a belt-pulley C, that may receive a belt driven by any usual counter-shaft at any desired speed, said roller being in practice driven at a very much higher speed than the feed-roller B, on which the clay or other earthy matter being cut up and disintegrated descends from the hopper and rests.

The metallic hubs $c$ $c'$, forming part of the cutter-carrying roller, are made hollow for part of their length to thereby lighten their weight, and the abutting edges of the two hubs are cored to leave to be ground true only ring-shaped ends.

The bearing $B^2$ for the shaft $B'$ is shown as made adjustable by suitable adjusting devices, (represented as screws $B^3$,) so that the space between said rollers may be regulated according to the stock being handled and the work being done.

The periphery of the roller B enters and substantially fills the spaces between the flanges $c^2$ $c^3$ of the cutter-carrying roller. The inner side of these flanges are in alinement, preferably, with the inner side of the hopper, so that all clay or other earthy matter entering the hopper comes directly onto the rollers B and C and goes between the roller B and the roller C.

By providing the hubs $c$ of the shaft $C^2$ with flanges fixed thereto that project beyond the cutter clay may be run through the machine between the cutter-carrying roller and feeding-roller without the clay coming onto the shaft $C^2$ and getting between said shaft and the bearings $C^4$, which is a matter of very considerable importance, as it results in saving of wear of the more expensive parts of the machine.

Having described my invention, what I claim as new, and desire to secure by Letters Patent, is—

1. In a machine of the class described, a feed-roller, and a cutter-carrying roller provided with a series of T-shaped grooves, combined with a series of cross-shaped blades having each a plurality of cutting edges, each edge of which may be used when desired and means for securing said blades in the grooves.

2. In a machine of the class described, a cutter-carrying roller provided with a series of T-shaped grooves and a series of cross-shaped cutters fitted in said grooves, said cutters having a plurality of cutting edges, and means to confine the cutters in said roller.

3. In a machine of the class described, a feed-roller, and a cutter-carrying roller having end flanges, the body of said rollers having end flanges extended beyond the periphery of said roller, the body of said roller having a series of T-shaped grooves and said flanges having cross-shaped passages, and a series of cross-shaped cutters inserted endwise into the passages of said flange and through said grooves in the body of the roller, each cutter having a plurality of cutting edges either of which may be used, the stock passing between said rollers being kept from contact with the shaft carrying said cutter-roller and from the bearings therefor.

In testimony whereof I have signed my name to this specification in the presence of two subscribing witnesses.

WILLIAM A. PARRY.

Witnesses:
GEO. W. GREGORY,
EDITH M. STODDARD.